(12) United States Patent
Kittelmann et al.

(10) Patent No.: US 7,483,220 B2
(45) Date of Patent: Jan. 27, 2009

(54) OPTICAL ARRANGEMENT WITH STEPPED LENS

(75) Inventors: Ruediger Kittelmann, Einbeck (DE); Harry Wagener, Alfeld (DE)

(73) Assignee: Auer Lighting GmbH, Bad Gandersheim (DE)

( * ) Notice: Subject to any disclaimer, the term of this patent is extended or adjusted under 35 U.S.C. 154(b) by 0 days.

(21) Appl. No.: 10/584,023

(22) PCT Filed: Dec. 22, 2004

(86) PCT No.: PCT/EP2004/014642

§ 371 (c)(1),
(2), (4) Date: May 25, 2007

(87) PCT Pub. No.: WO2005/061956

PCT Pub. Date: Jul. 7, 2005

(65) Prior Publication Data

US 2007/0279911 A1 Dec. 6, 2007

(30) Foreign Application Priority Data

Dec. 22, 2003 (DE) ................. 103 61 117
Dec. 22, 2003 (DE) ................. 103 61 121
Dec. 22, 2003 (DE) ................. 103 61 122

(51) Int. Cl.
*G02B 3/08* (2006.01)
*G02B 27/02* (2006.01)
*F21V 5/00* (2006.01)
*F21V 11/00* (2006.01)

(52) U.S. Cl. ................ 359/742; 359/799; 362/326; 362/355

(58) Field of Classification Search ........... 359/707, 359/741, 742, 743, 799; 362/326, 335, 336, 362/337, 339, 340, 355
See application file for complete search history.

(56) References Cited

U.S. PATENT DOCUMENTS

| 2,853,599 | A | | 9/1958 | Kliegl |
| 5,138,540 | A | | 8/1992 | Kobayashi et al. |
| 6,654,172 | B2 | * | 11/2003 | Pond et al. .......... 359/619 |
| 6,899,451 | B2 | * | 5/2005 | Kittelmann et al. ...... 362/538 |

(Continued)

FOREIGN PATENT DOCUMENTS

CN 1386203 12/2002

(Continued)

OTHER PUBLICATIONS

Office Action for corresponding Chinese Patent Application No. 200480041736.8 dated Aug. 1, 2008.

*Primary Examiner*—David N Spector
(74) *Attorney, Agent, or Firm*—Ohlandt, Greeley, Ruggiero & Perle, L.L.P.

(57) ABSTRACT

The invention comprises an optical arrangement for illumination purposes, in particular for a stepped lens spotlight, comprising a stepped lens with a light-diffusing element, in particular a diffusing screen, in which the diffusing screen is arranged in a first region and the stepped lens is arranged in a second region, and in which, with the change in the shape of the light impinging on the optical arrangement and/or the size of the light illuminating the optical arrangement, it is possible to set the aperture angle of the light emerging from the optical arrangement, in particular between two limit values, a smaller $\alpha_{Sp}$ and a larger $\alpha_{F1}$.

47 Claims, 10 Drawing Sheets

U.S. PATENT DOCUMENTS

Figure 1:
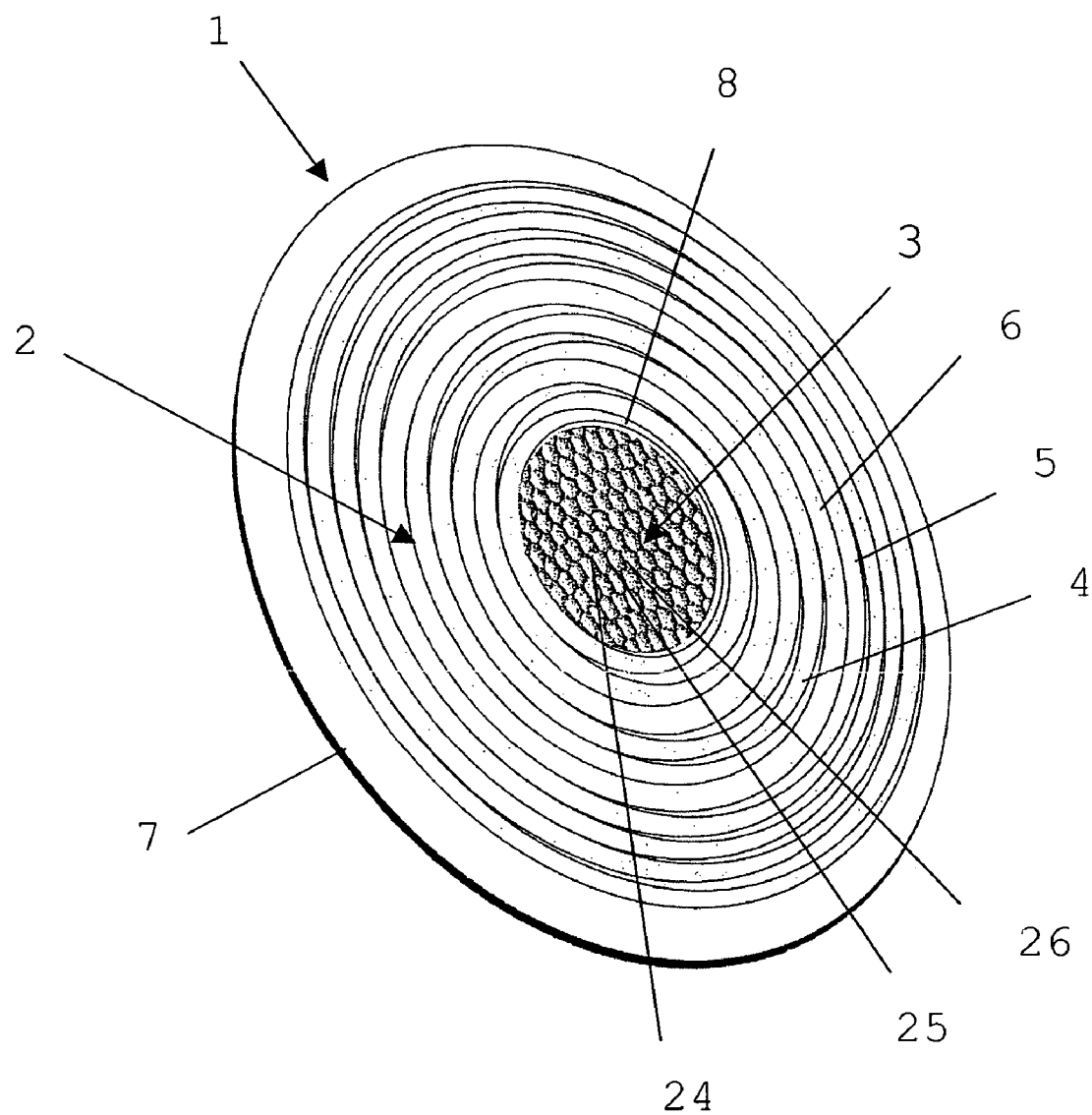

| | | |
|---|---|---|
| 2002/0024822 A1 | 2/2002 | Pond et al. |
| 2003/0063466 A1 | 4/2003 | Kittelman et al. |
| 2005/0185300 A1* | 8/2005 | Kittelmann et al. ......... 359/742 |

FOREIGN PATENT DOCUMENTS

| | | |
|---|---|---|
| DE | 3806879 | 3/1989 |
| DE | 19832665 | 1/2000 |
| EP | 0391287 | 10/1990 |
| EP | 1167868 | 1/2002 |
| EP | 1242399 | 9/2002 |
| JP | 61097602 | 5/1986 |
| JP | 6102415 | 4/1994 |
| WO | WO 0186341 | 11/2001 |

* cited by examiner

OPTICAL ARRANGEMENT WITH STEPPED LENS

The invention relates generally to an optical arrangement with at least one stepped lens and in particular to a stepped lens having an integrated diffusing screen for illumination purposes.

Stepped or Fresnel lenses go back to the French physicist Augustin Jean Fresnel, who created this optical element, which is also referred to as an annular lens, back in the nineteenth century. In contrast to the optical lenses with a solid body that are otherwise used, stepped or Fresnel lenses have concentric steps, which are, arranged essentially perpendicular to the principal plane of the lens and between which annular segments are situated. The shape of the optically effective surfaces of the annular segments approximately corresponds to the shape of surface segments of a normal lens with a solid body, but said surfaces lie substantially nearer to the opposite surface of the respective lens. Furthermore, the optically essentially noneffective areas of the steps are arranged as far as possible parallel to the main direction of light propagation in order to generate the smallest possible reflections or little undesirable scattered light. Therefore, to an approximation, except for disturbances caused by the steps, a Fresnel lens has similar imaging properties to a normal lens. Despite said disturbances, however, the Fresnel lens has significant advantages over conventional lenses which make this type of lens the distinctly preferred or else only possible choice in many applications. Fresnel lenses have a smaller thickness, require less optical material, are consequently lighter and have a lower absorption and thus also less heating-up particularly when they are used in lighting devices with high light intensities.

Fresnel lenses are used highly advantageously for example in stepped spotlights for theater, stage, studio, film or else for architectural or design illumination.

The smaller thickness of the Fresnel lenses also means, however, that they are often substantially simpler to produce. For embossing, injection molding or hot-forming, a thinner Fresnel lens can be controlled significantly better in terms of its cooling-down and mold-release behavior than its counterpart with a solid volume. These advantages gain in importance as the size of said lenses increases. Consequently, preferred areas of application are illumination technology, in particular in the theater, studio, in particular for film, on the stage and in architecture, where a high quantity of light frequently also entails a high thermal loading but disturbances of the imaging properties are of lesser significance.

A stepped lens with a centrally arranged, parallel prism arrangement that directs the light preferably into the lower half-space is known from the signaling technology of railborne traffic, this being used to provide part of the light that enters the stepped lens for signal discernibility in the near range.

WO 01/86341 A1 describes a signal transmitter having a stepped lens with scattering elements having a relatively short focal length, in the case of which the short-focal-length scattering elements extend the luminous angle of the emitted light. However, the scattering elements arranged over the whole area of the stepped lens do not permit a change in the luminous flux, in particular the aperture angle thereof, by shifting the intensity of the light illuminating the stepped lens at the location of the stepped lens.

EP 0 391 287 describes an operating luminaire comprising a hyperbolic mirror and a lens arrangement on the light exit side with at least three Fresnel lenses having different focal lengths. What is achieved by virtue of the different focal lengths of the stepped lenses is that a homogeneous light intensity over a relatively large depth of field and hence a homogeneous illumination of a deep surgical wound are possible. Preferably hexagonal polygons having a smaller structural size than the structure of the stepped lenses used serve for further homogenization within the luminous field. However, a change in the aperture angle of the emerging light field or the size of the illuminated field is not effected with this arrangement and is to be obtained by means of other, additional measures. However, additional components are required for this.

An optical system for stepped lens spotlights is mentioned in EP 1 242 399 A2, which was invented by the inventors of the present application and in the case of which the aperture angle of the emerging light is effected by adjusting the distance of the lamp relative to the reflector of this system. In this case, however, a generally very hot lamp is moved mechanically relative to the reflector, which requires considerable mechanical outlay for its adjustment. Firstly, it is necessary to ensure that the lamp that is vibration-sensitive to a greater extent in a hot state is not damaged and, secondly, the adjusting elements must have both a high temperature resistance and a high resistance to thermal cycling.

JP 61 097 602 A relates to a screen, such as, for example, the ground-glass screen of a reflex camera, in the case of which the edge regions often appear darker than its center since image field rays that are incident obliquely at the edge tend also to emerge further away from the center obliquely after passing through the ground-glass screen. For the purpose of improving the brightness of the edge region of the screen, but without decreasing the brightness of the central region, the teaching of this document comprises equipping the central region of the assigned Fresnel lens with scattering elements such that the entire image area of this screen is illuminated uniformly. However, a change in the aperture angle of the emerging light field or the size of the illuminated field is not effected with this arrangement, nor would it be expedient in a system of this type.

DE 38 06 879 C1 discloses an optical filter lens in which, for the purpose of realizing an intensity profile that is as uniform as possible for sensor-related or metrological purposes in the light field of a Fresnel lens, said Fresnel lens is provided with radially extending structures which are intended to prevent an increase in the intensity in the center of the light field. In this case, the light from the radially extending structures is no longer imaged on the sensor. However, an arrangement of this type is disadvantageous for illumination applications since undesirable light losses occur due to the regions that cannot be imaged. Furthermore, for illumination devices, for example in the areas of studio, theater, film and architecture, it is often highly desirable to bring about a desired accentuation of specific regions of the illuminated object by means of a brighter central region.

The invention is based on the object of further improving the usability of a stepped lens, in particular for lighting applications, and in particular of simplifying the construction of lighting devices by using such a stepped lens.

If, in the case of the optical arrangement according to the invention for illumination purposes, in particular for a stepped lens spotlight, a diffusing screen is arranged in a first region and a stepped lens is arranged in a second region, it is possible, in a surprisingly simple and extremely flexible manner to change the aperture angle $\alpha$ of the light emerging from the optical arrangement, in particular set said angle between two limit values, a smaller $\alpha_{Sp}$ and a larger $\alpha_{F1}$.

Designs with a reduced number of mechanical components and a greatly increased luminous efficiency are thereby made possible, particularly when this optical arrangement is used in a stepped lens spotlight.

A change in the light mixing ratio of geometrically optically guided light that has passed through the stepped lens relative to the light that has passed through the diffusing screen is made possible in a simple manner.

One major advantage is that when an illuminating light cone is passed through the optical arrangement, it is possible, just by altering the position of the light cone relative to the optical arrangement, to achieve a change in the luminous angle, for example from 8° to 60°, from 8° to 70° or even from 4° or 8° to 80°, with a homogeneous change in the light distribution.

In this case, the aperture angle is defined as that angle at which, as measured from the optical axis of the system, the light intensity has fallen to a tenth of the intensity, relative to the light intensity in the direction of the optical axis.

It is possible in a surprisingly simple manner in this case to change the aperture angle continuously and in the process to always maintain a homogeneous illumination within the illuminated angular range.

The combination of geometrical-optical imaging of the stepped lens with a scattering lobe—superimposed thereon—of the light scattered at the diffusing screen also permits lighting illumination light distributions in the case of which not only is it possible to suppress the light source or luminous body image, but it is even possible to greatly reduce or avoid faults of illuminating beam paths given a suitable choice of the diffusing structure and the geometrical dimensioning thereof.

An application of particular interest is found in the case of reflector arrangements with a relatively small light source in relation to their holder, such as, for example, a high-pressure discharge lamp having emission ranges of the order of magnitude of a few millimeters and distinctly larger holder diameters. In the case of light sources of this type, the central light field can be darkened by virtue of the fact that the holder passing through the reflector requires an opening within the reflector which is distinctly larger than the light source and light beams thus cannot be reflected near the optical axis within said opening. By virtue of a suitable choice of the forward scattering lobe of the light-diffusing device, preferably a circular central diffusing screen, it is possible, surprisingly, essentially to retain the optical properties of the stepped lens and a central intensity decrease can nevertheless be avoided.

In this case, the optical arrangement is advantageously formed in one piece, in order that both the stepped lens and the diffusing screen are produced in a single embossing operation expediently in terms of production engineering.

In the most preferred embodiment, the first and second regions that are in each case accorded to the stepped lens and the diffusing screen occupy real surfaces of the optical arrangement, preferably concentrically arranged surfaces having different diameters ($2R_{StI}$, $2R_{StrA}$).

In this case, the ratio of the surface size of the stepped lens surface to the diffusing screen surface can define in wide ranges the ratio of the portions—taking effect in each case—of the emerging light that can be utilized for illumination purposes, and is optionally greater than 2 to 1 (stepped lens surface to diffusing screen surface), the ratio of the surface size of the stepped lens surface to the diffusing screen surface is preferably greater than 10 to 1 and the ratio of the surface size of the stepped lens surface to the diffusing screen surface is most preferably greater than 100 to 1.

Within the meaning of this description, the surface of the stepped lens or of the diffusing screen is not the actual surface with all microscopic and macroscopic elevations and depressions, but rather is that area which, upon illumination parallel to the optical axis in a plane that runs perpendicular to the optical axis and is arranged directly behind the optical arrangement, corresponds to the area of the shadow casting of the stepped lens or the diffusing screen.

In an extremely advantageous manner, the aperture angle of the light emerging from the diffusing screen in a vertical direction may be different from the aperture angle in a horizontal direction, and the diffusing screen may thereby give rise optionally to a light field illuminated in nonround, ellipsoidal, polygonal and in particular rectangular and/or square fashion.

Rectangular and in particular also square light fields permit a plurality of light fields to be strung together, whereby large areas, for example in the studio, on the stage or in architecture illumination, can be illuminated homogeneously.

Depending on the illuminated area of the diffusing screen, transitions from light fields illuminated in round fashion to light fields illuminated in nonround, ellipsoidal, polygonal and in particular rectangular and square fashion may also arise if, by way of example, the diffusing screen contains a plurality of regions, in particular annular surface regions, which scatter light in each case in different directions or to different extents.

In this case, the round light field of the spot position, in the event of adjustment, may for example undergo transition to a nonround, for example square, light field if the light cone, although still covering the entire diffusing screen diameter $2R_{StrA}$, no longer covers the stepped lens. With further adjustments and the light cone becoming smaller, the light field may once again undergo transition to a differently shaped, for example elliptical, light field if the light cone only covers an internal diameter $2R_{StrI}$, the portions of which direct the light only into the elliptical light field.

The shape of the illuminated light field can be adjusted flexibly in this way.

Furthermore, the subdivision of the diffusing screen into regions having different scattering behaviors also permits the type of light incidence to become controllable. The round light field of the spot position, in the event of adjustment, may for example firstly undergo transition to a square light field with a soft edge fall if the light cone, although still covering the entire diffusing screen diameter $2R_{StrA}$, no longer covers the stepped lens and, with further adjustment and the light cone becoming smaller, the light field may undergo transition to a light field with a hard edge fall if the light cone only covers an internal diameter $2R_{StrI}$, the portions of which direct the light only into the square light field but only into the latter very much more exactly.

In an advantageous manner, for a stepped lens spotlight having an elliptic reflector having an ellipticity $\epsilon$, the ratio of the focal length to the radius $n_{St1} = R_{St1}/F_{St1}$ of the stepped lens is greater than 0.5 times $1/\sqrt{\epsilon^2-1}$, preferably greater than 0.7 times $1/\sqrt{\epsilon^2-1}$, most preferably greater than 0.9 times $1/\sqrt{\epsilon^2-1}$.

The stepped lens is preferably an aspherical lens, in order to compensate for spherical aberrations and to attain the best possible imaging performance.

If the stepped lens has a basic body with an essentially concave surface, it is thereby possible to take account of more complex optical requirements since this makes it possible to define concave-convex or biconcave lenses, for example, in which the stepped lens and also the basic body thereof become optically effective.

Furthermore, the stepped lens may have a basic body with an essentially convex surface, in order thus to create convex-concave or biconvex lenses.

To an approximation, the shape of the basic body may be utilized independently in optically beam-shaping fashion and the beam-shaping properties of the stepped lens may be utilized in combination or in superposed fashion.

In this case, the basic body of the stepped lens is understood to be that part which would result if the steps of the stepped lens were removed therefrom; this means the volume material on which the steps of the stepped lens are applied or into which said steps are impressed.

It is thus possible, in terms of production engineering, firstly to calculate the shape of the desired stepped lens and to attain additional optical beam-shaping properties by means of the further configuration of the basic body, preferably in planoconcave, planoconvex, biconcave, biconvex or concave-convex form.

If the essentially annular, optically effective surfaces of the steps are configured as circle-arc surface segments, it is possible to utilize geometries which are simple to realize in terms of production engineering and which nevertheless still have relatively good optical properties.

In a simple, cost-effective embodiment, the essentially annular, optically effective surfaces of the steps are formed in the shape of cone envelopes.

However, the optimum optical imaging performance is achieved essentially in the case of a converging stepped lens, thus a lens with a positive focal length and a real focal point, if the essentially annular, optically effective surfaces of the respective steps are shaped such that an approximately planar wave with phase fronts perpendicular to the optical axis leaves the lens when light originating from a single real focal point enters said lens. In the case of a diffusing lens, thus a lens with a negative focal length and a virtual focal point, the optimum is achieved when the light of a planar wave which enters the stepped lens is converted into a spherical wave whose midpoint appears to originate from a single virtual focal point.

In a particularly preferred embodiment, the diffusing screen is arranged only in a central region of the stepped lens and preferably on the side of the steps, since this embodiment can already be produced by means of a single hot-forming step with high precision.

It is highly advantageous if the diffusing screen is arranged in delimited fashion in a centric region of the stepped lens, since it is then possible, by this means, to generate a surprisingly variable intensity distribution in the case of lighting illumination devices. Thus, by way of example, through the use of diaphragms or through changed focusing of the entering light field, it is possible to change the diameter thereof and to create a variably adjustable transition from scattered to geometrically-optically imaged light. As long as only light impinges on the inner diffusing screen, the properties thereof define the shape of the emerging and illuminating light field. If geometrical-optical imaging properties increasingly arise when the diameter of the light field is enlarged, it is possible, by way of example, to achieve a highly uniform enlargement of the illuminating light cone.

An even more continuous and smoother transition in the light distribution to be changed can be achieved if the light-diffusing element has regions that diffuse to different extents, preferably a region that diffuses to a greater extent centrically and a region that diffuses to a lesser extent marginally.

Depending on the material of the diffusing screen, the latter is preferably produced in a manner adapted to its diffusing behavior by hot-forming, in particular embossing, and/or injection molding.

Preferred materials for the stepped lens and/or the diffusing screen are glass and glass-ceramic materials. The high resistance to alternating temperatures is particularly advantageous in the case of glass ceramics.

Furthermore, the optical arrangement with stepped lens and diffusing screen may be composed of a plurality of elements in order, by way of example, to utilize different production methods and the advantages thereof.

Thus, an, in particular embossed, plastic stepped lens may be connected to a diffusing screen consisting of glass, thus resulting in a hybrid composite made of glass and plastic.

If the stepped lens comprises a material with a first dispersion behavior, and a further lens with an opposite refractive power, preferably a stepped lens, with a material with a second dispersion behavior, it is even possible to create chromatically corrected or achromatic lens systems.

Optical path length in the sense of this description is regarded as the wavelength of a central region of the light spectrum respectively used.

If the stepped lens is an embossed plastic lens, it may be highly advantageous if this lens has an optical path length difference at the respective step of less than about 1000 optical wavelengths, since it is then possible generally to realize a relatively flat stepped lens which causes only small disturbances of the geometrical-optical light propagation.

Furthermore, in the case of locally high light intensities, it may be highly practical, depending on the construction, to depart from the conventional use of gelatin filters, which, in the region of strong light intensity, such as in the vicinity of real focal points, for example, can rapidly bleach or even melt and ignite, and instead to use coated or colored glasses.

Thus, if the stepped lens and/or the diffusing screen are/is formed as a filter, in particular as a UV, IR or colored band-pass filter and/or conversion filter, it is possible to provide very much more reliable and more exact filtering of the light. Furthermore, it lies within the scope of this configuration to produce sets of optical arrangements which, preferably with dichroic or interference filter layers, are coordinated with defined light temperatures for defined light sources.

Thus, by way of example, a defined color shift in the direction of lower color temperature values may impart to a high-pressure discharge lamp the spectrum of a black body radiator, such as an incandescent lamp, for example.

Furthermore, spectrally predominant bands of excited discharge lines can be moderated in a defined manner and a more homogenous spectral distribution can thus be achieved.

In addition, with filter arrangements of this type, for predetermined spectra of light sources, it is also possible to simulate lighting atmospheres in the spectral distribution thereof, such as, for example, early morning light, evening light, storm or thunderstorm light, so that most requirements appertaining to studio, theater, film and architecture can be met by means of a single light source and an assigned set of optical arrangements according to the invention.

Since dichroic or interference filters permanently withstand high radiation intensities with a high degree of spectral precision, these filters, depending on the application, may not only be spectrally better but, due to their long lifetime, may also be less expensive than conventional color filter sheets. Furthermore, harsh ambient conditions, such as in the case of architecture illumination or in the case of outdoor recordings, for example, are a further reason for using optical arrangements of this type.

When using plastic lenses and/or diffusing screens, it is particularly advantageous if these are coated with a mechanical antiscratch layer.

Furthermore, undesirable reflections, in particular at the stepped areas, may not only lead to the loss of light from the main luminous flux, but brighter circles or points may even be formed in the illumination plane, which can be greatly reduced or even suppressed by means of an antireflection layer on said stepped areas.

With the optical arrangement according to the invention for illumination purposes, in particular for a stepped lens spotlight, comprising a stepped lens and a light-diffusing element, it is possible, in a very advantageous manner, to create a stepped lens spotlight which provides a variable aperture angle of the emerging light and a homogeneously illuminated light field in every setting of the aperture angle in conjunction with high efficiency.

This object is achieved in a surprisingly simple manner by means of a stepped lens spotlight.

The inventors have discovered that the conventional high light losses of stepped lens spotlights can be avoided in a surprisingly simple manner with a diffusing screen. In this case, it is particularly advantageous if the stepped lens has a diffusing screen which, in a particularly preferred manner, is formed in circular fashion and is arranged only in the center of the stepped lens.

In this embodiment, the dark regions in the center of the illumination field can be avoided very effectively in every position of the stepped lens spotlight, but the high light losses in the spot position of the reflector nevertheless do not occur any longer.

Surprisingly, it is evident that the geometrical-optical beam path of the light emerging from the reflector illuminates a smaller region at the location of the stepped lens precisely when the required proportion of scattered light is increased.

The inventors have made use of this effect in order, by means of the invention, to create an automatic or adaptive light mixing system which, synchronyously with the adjustment of the stepped lens spotlight, mixes with the geometrical-optically imaged light only that scattered light component which is required for this position.

This light mixing ratio, which can be virtually optimally adapted to the respectively required light distributions, is referred to hereinafter only as the mixing ratio for short.

By means of this automatic light mixing system, the correct mixing ratio and thus always a very homogeneously illuminated light field is created essentially for every position of the reflector, without unnecessary scattering losses occurring, however, in the process.

In this case, the mixing ratio of the stepped lens illuminated over the whole area can be defined by the choice of the diameter of the diffusing screen in relation to the remaining area of the stepped lens, and the aperture angle of the scattered light can be freely defined in wide ranges by the scattering properties of the stepped lens.

Furthermore, the scattering effect may vary on the integrated diffusing screen itself, so that, by way of example, more strongly scattering regions are arranged in the center of the diffusing screen and less strongly scattering regions are arranged at the edge of said screen. As a result of this, a more highly focused beam bundle is additionally also expanded and it is then possible to realize extremely wide illumination angles.

As an alternative, it is also possible for the edge of the diffusing screen to be configured not only such that it ends abruptly, rather said edge may be designed such that its scattering effect decreases continuously, and may also extend under or above the stepped lens. This allows further adaptations to the position-dependent mixing ratios.

Figure 12:
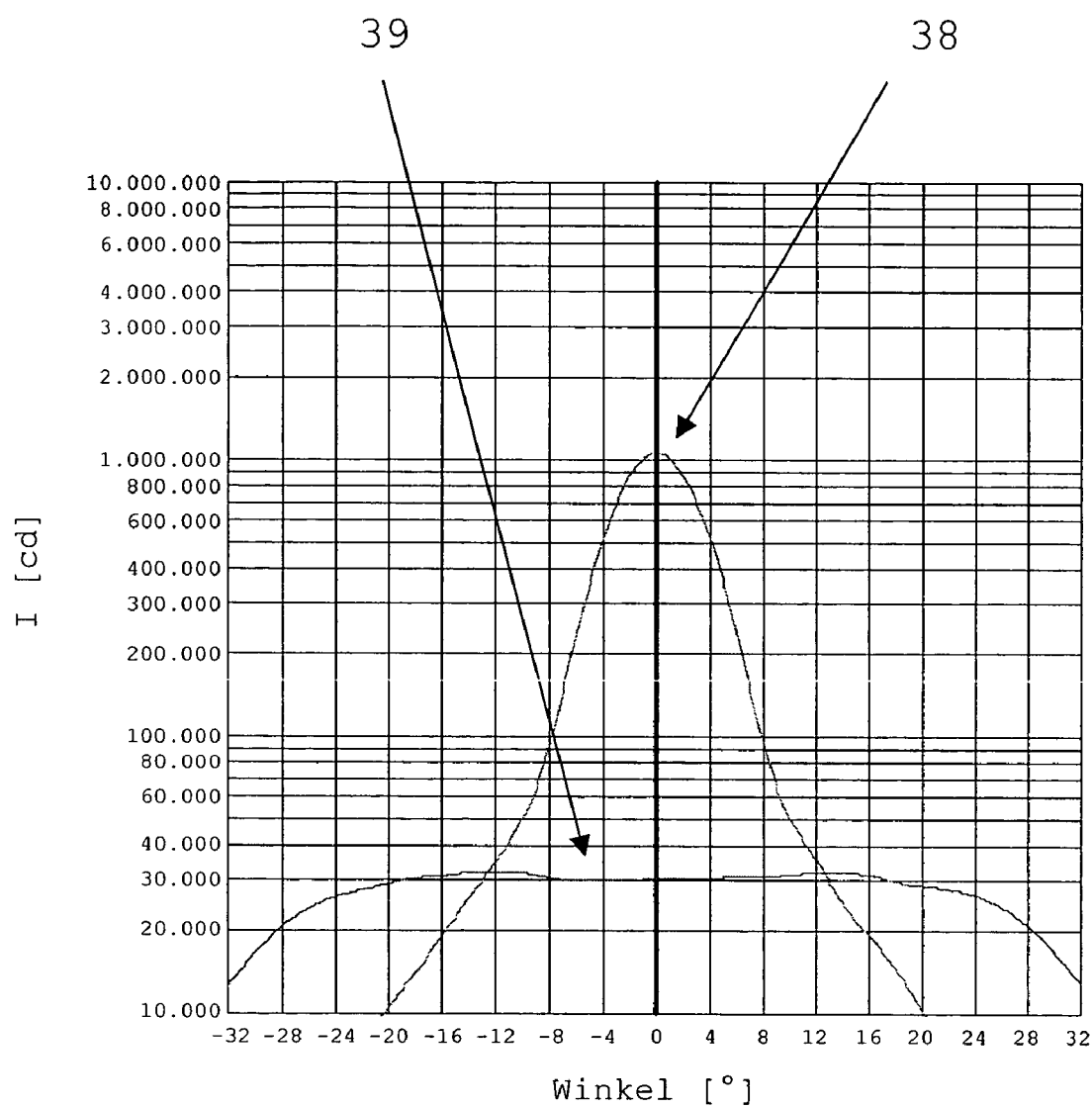

At the same time, the uniformity of the illuminance is retained in the entire light field, as is illustrated by way of example in FIG. 12 both for the spot position and for a flood position.

A large-aperture ellipsoidal reflector is provided according to the invention. The spot position is set by virtue of the fact that the lamp filament of a black body radiator, in particular of a halogen lamp, or the discharge arc of a discharge lamp is situated at the reflector-side focal point of the ellipsoid and the ellipsoid's second focal point remote from the reflector is arranged approximately at the real focal point of the stepped lens that is near to the reflector.

The light reflected from the reflector, before entering the stepped lens, is virtually completely focused onto the ellipsoid's focal point remote from the reflector. The discharge arc or the lamp filament situated at the reflector-side focal point of the stepped lens is imaged to infinity after passing through the stepped lens and its light is thus converted into a virtually parallel beam bundle.

Given an expedient choice of the aperture angle of the reflector and the stepped lens, the light reflected from the reflector is virtually completely acquired by the stepped lens and radiated forward as a narrow spot light bundle.

In a further embodiment, which is mechanically much more complicated, however, the aperture angle of the light bundle emerging from the stepped lens can be increased virtually as desired by altering the lamp position with regard to the reflector, on the one hand, and the distance between the stepped lens and the reflector, on the other hand, in a suitable manner.

In order to maintain the good properties of conventional stepped lens spotlights with regard to the uniformity of the illuminance, these distance alterations should be effected by means of an expediently chosen constraint coupling.

In general, both the reflector, the stepped lens and/or the diffusing screen may be coated at least on one side, for example with an antiscratch and/or antireflection layer in the case of plastic.

One preferred embodiment of the invention comprises a stepped lens spotlight in which the light-reflecting surface of the reflector, preferably having partial areas or facets, is structured in light-scattering fashion and no, one or two surfaces of the stepped lens are structured in light-scattering fashion. This results in a defined portion of the superimposition of scattered light with respect to geometrically-optically imaged light, which can reduce dark rings in the light field.

According to the invention, the use of the spotlight is advantageously provided for architecture, medicine, film, stage, studio and photography and also in a flashlight.

The invention is explained in more detail below using preferred exemplary embodiments and with reference to the accompanying drawings.

Figure 2:
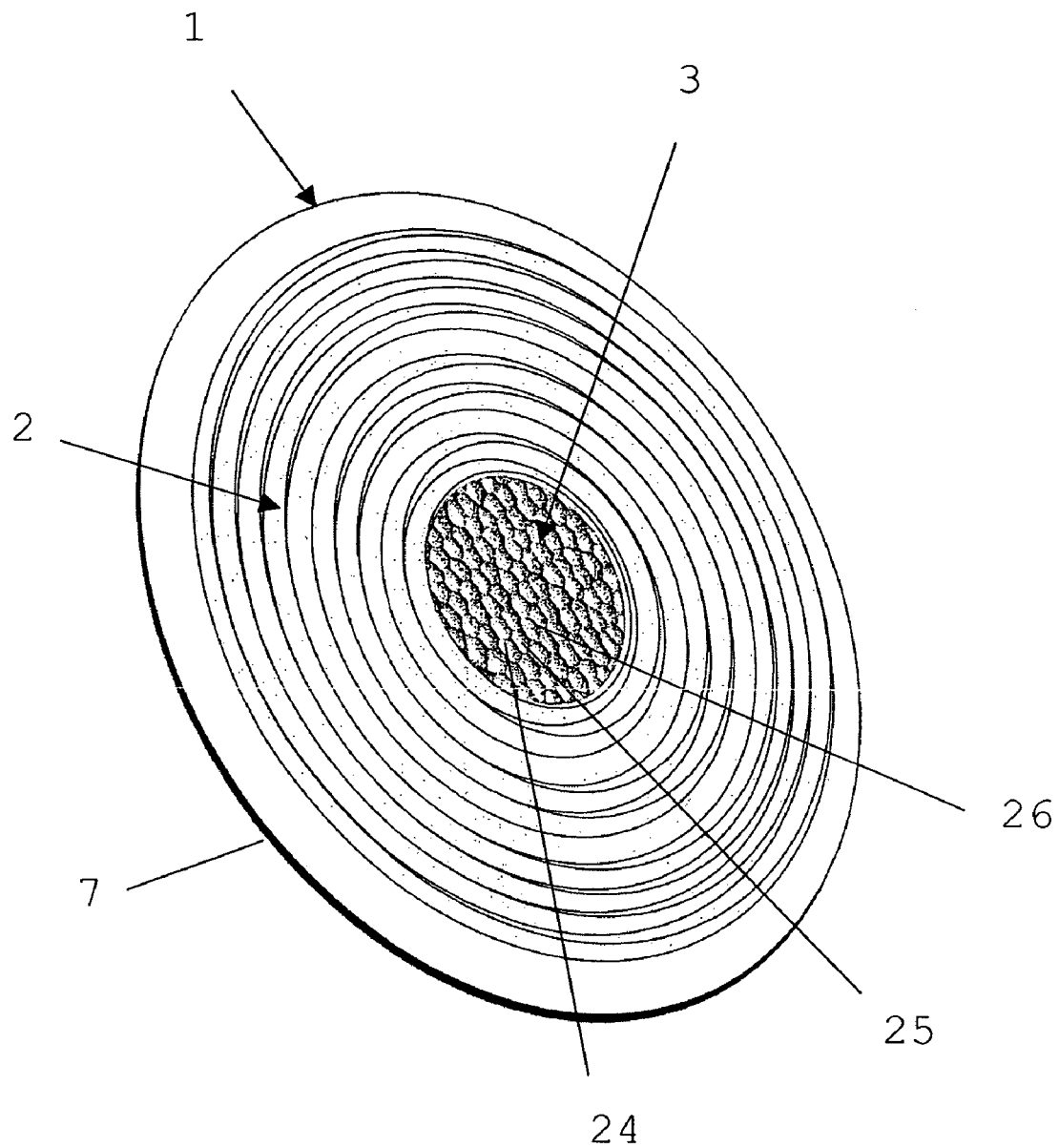
Figure 3:
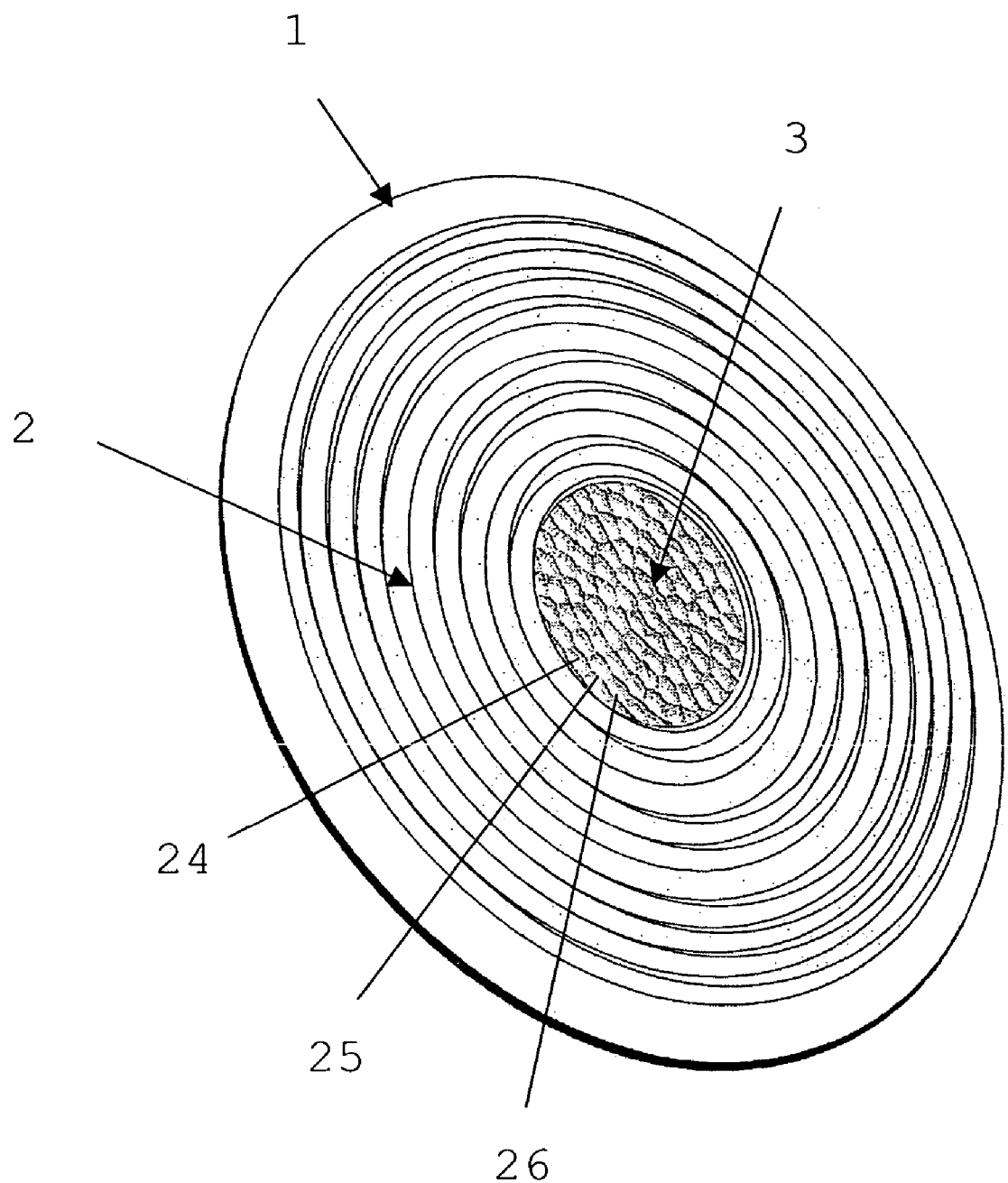
Figure 4:
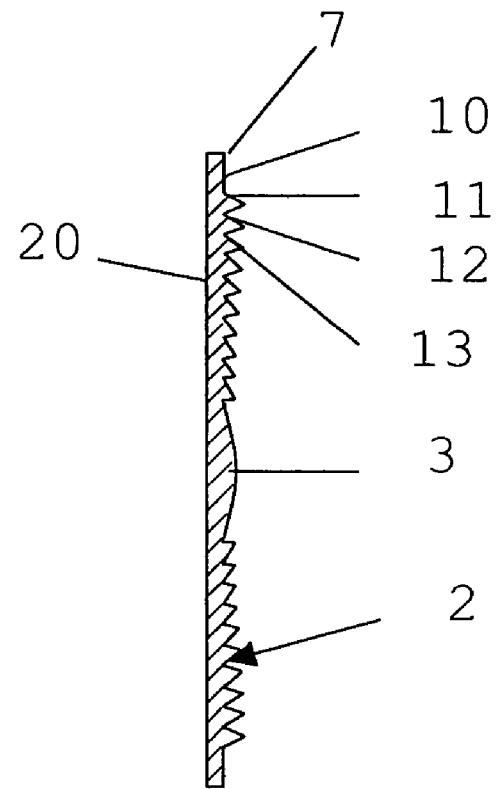
Figure 5:
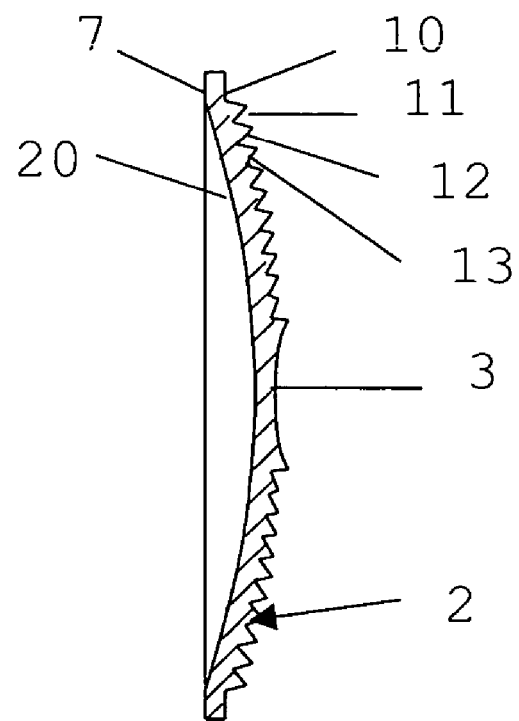
Figure 6:
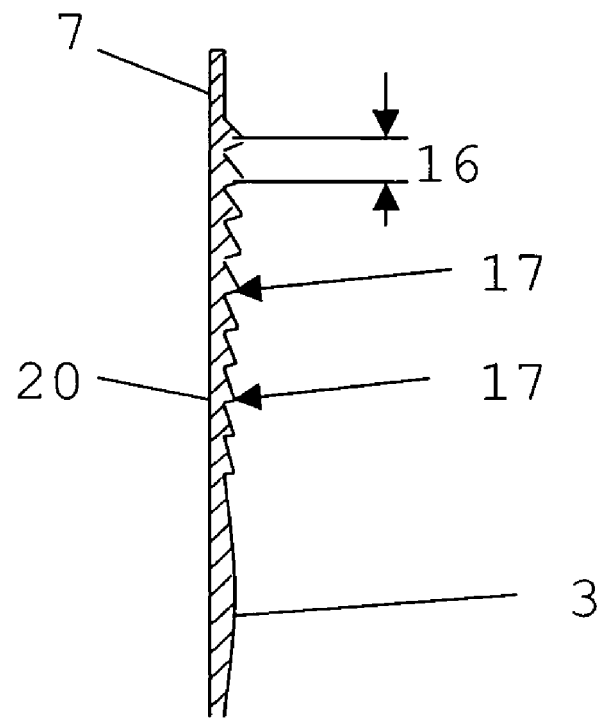
Figure 7:
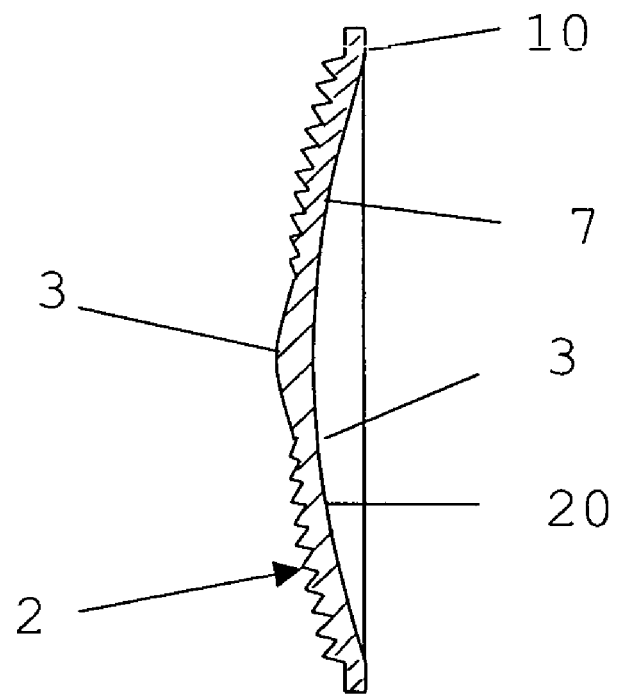
Figure 8:
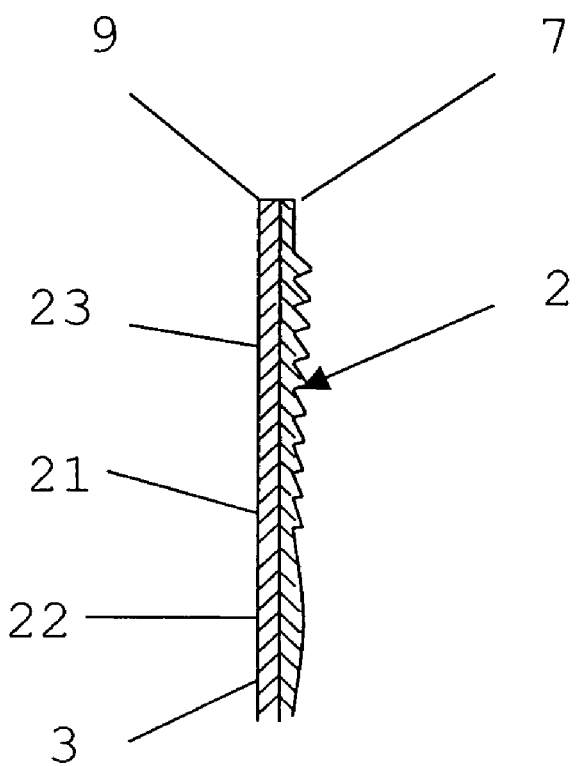
Figure 9:
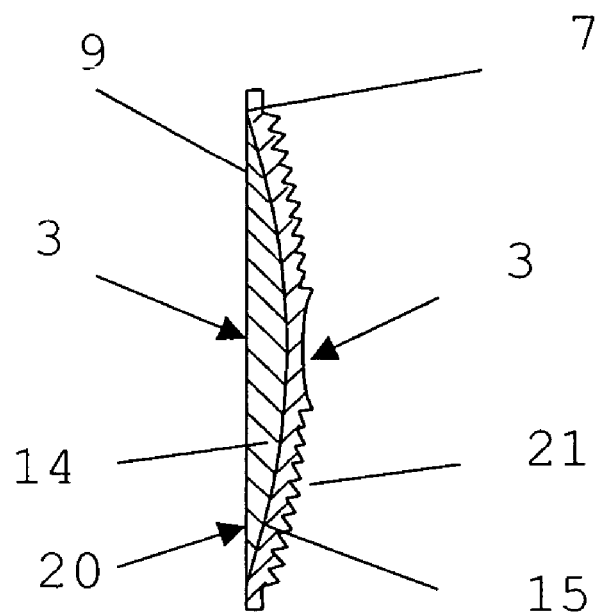
Figure 10:
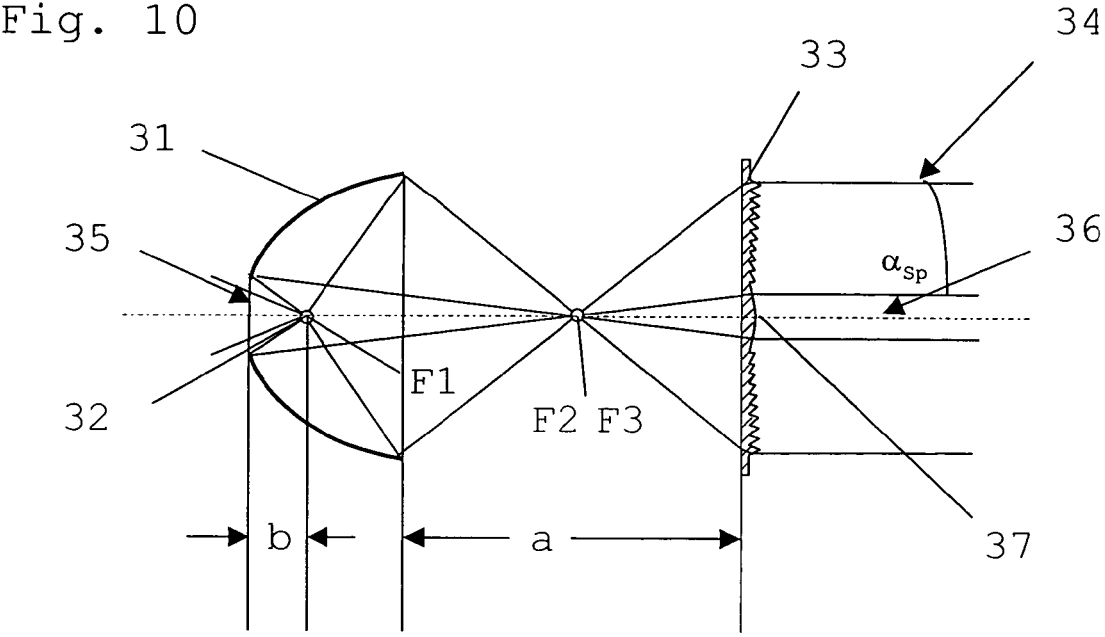
Figure 11:
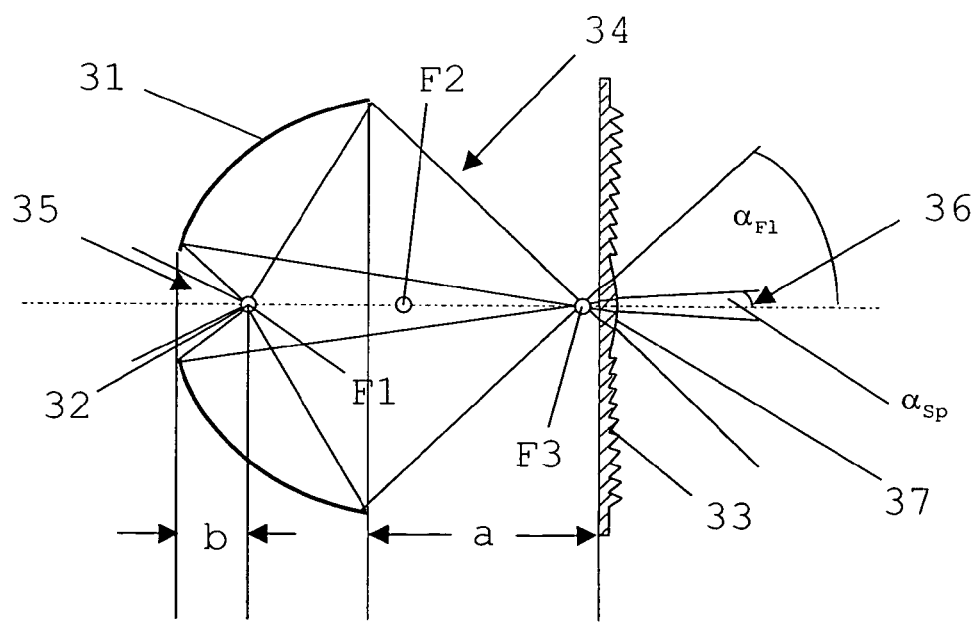
Figure 13:
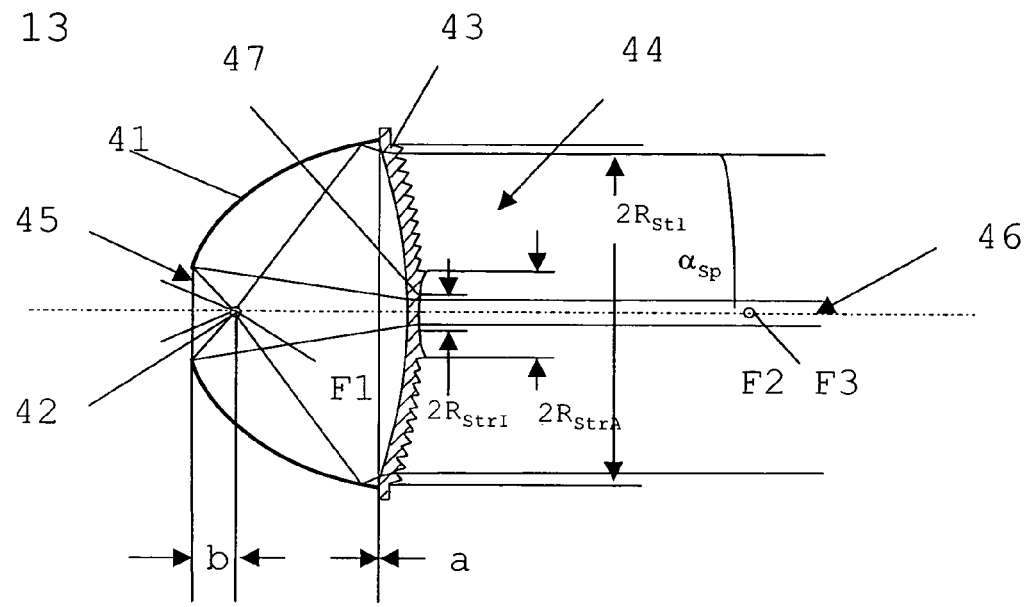
Figure 14:
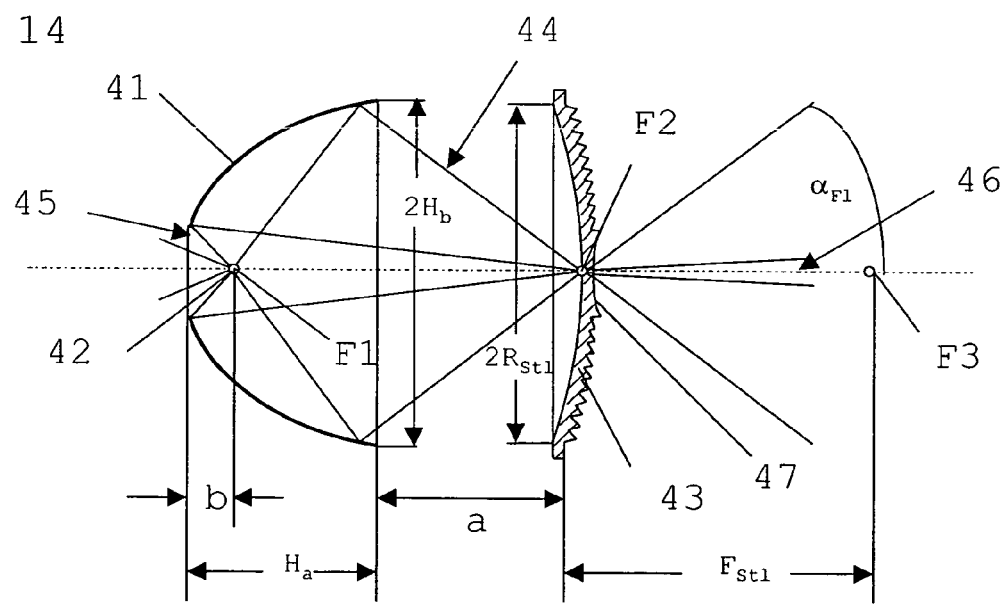
Figure 15:
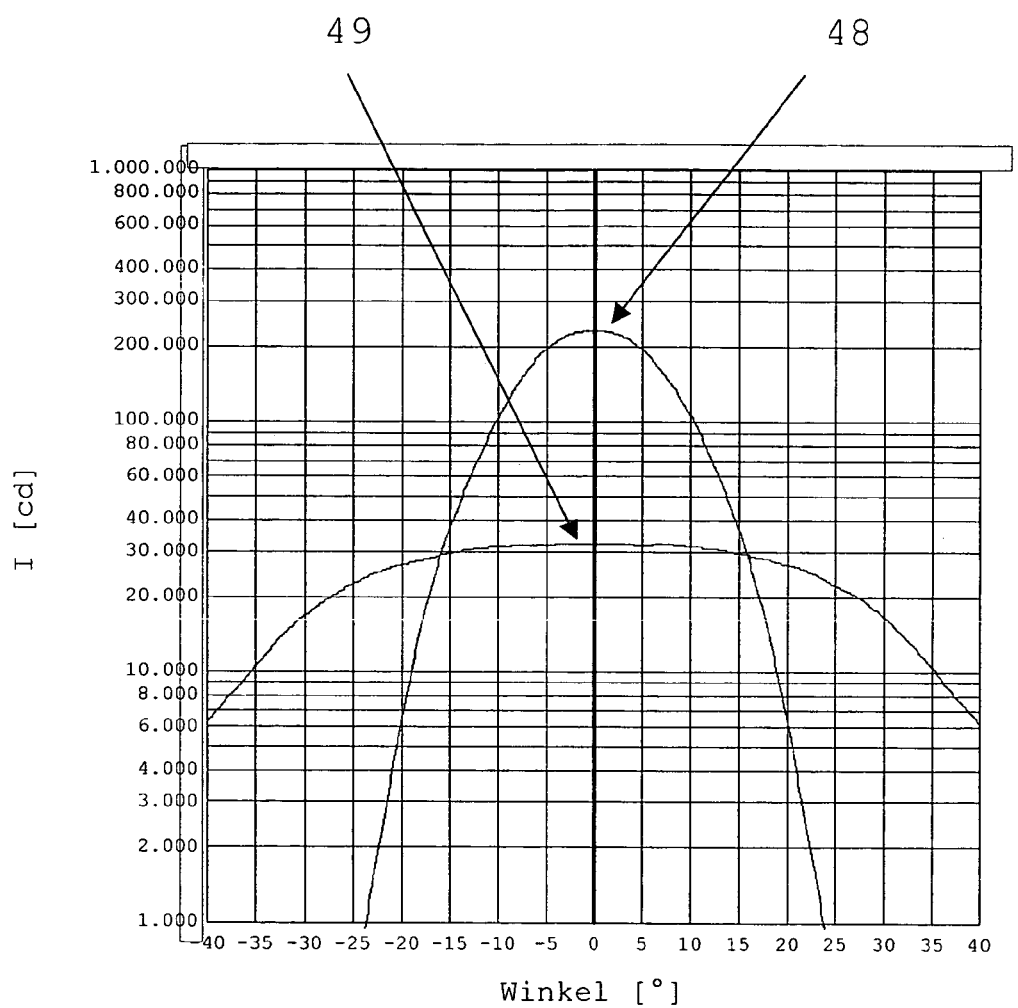

In the figures:

FIG. 1 shows a first embodiment of the optical arrangement of a stepped lens with an approximately centrically arranged, essentially circular diffusing screen which has individual facets that are slightly rotated with respect to one another, FIG. 2 shows a second embodiment of the optical arrangement of a stepped lens with an approximately centrically arranged, essentially circular diffusing screen which has facets which have been offset from their regular position by means of a Monte Carlo method, FIG. 3 shows a third embodiment of a stepped lens with an approximately centrically arranged, essentially circular diffusing screen, in the case of which the individual facets of the diffusing screen lie on an Archimedes' spiral, FIG. 4 shows a cross section through a planoconvex lens with a central diffusing screen, the basic body of which is formed in essentially plane fashion and the stepped lens of which is formed in convex fashion, FIG. 5 shows a cross section through a biconcave stepped lens arrangement which has geometrical-optical beam-expanding or light-diffusing properties and in the case of which both the basic body and its geometrically-optically effective stepped lens system are essentially configured in concave fashion, FIG. 6 shows an enlargement of a detail of an upper segment of the cross-sectional illustration of FIG. 4, FIG. 7 shows a cross-sectional illustration of a convex-concave stepped lens arrangement whose basic body is configured in concave fashion and whose geometrically-optically effective stepped lens system is essentially configured in convex fashion, FIG. 8 shows a cross-sectional illustration of a hybrid lens arrangement comprising an embossed planoconvex plastic stepped lens arrangement fitted to a diffusing screen consisting of glass, FIG. 9 shows a cross-sectional illustration of a hybrid lens achromat in which a planoconvex lens consisting of glass is connected to a biconcave stepped lens consisting of plastic or a glass with a different dispersion, FIG. 10 shows an embodiment of a stepped lens spotlight with a stepped lens having positive refractive power in the spot position, the reflector's focal point that is remote from the reflector being approximately superimposed with the real focal point of the stepped lens on the left-hand side, FIG. 11 shows the embodiment of the stepped lens spotlight as shown in FIG. 10 in a first flood position, the reflector's focal point that is remote from the reflector being arranged near to a surface of the stepped lens, FIG. 12 shows an aperture-angle-dependent logarithmic representation of the light intensity of the stepped lens spotlight in the spot position thereof and in one of the flood positions thereof, FIG. 13 shows an embodiment of a stepped lens spotlight with a stepped lens having negative refractive power in the spot position, the reflector's focal point that is remote from the reflector being approximately superimposed with the virtual focal point of the stepped lens on the right-hand side, FIG. 14 shows the embodiment of the stepped lens spotlight as shown in FIG. 13 in a first flood position, the reflector's focal point that is remote from the reflector being approximately arranged in a surface of the stepped lens that is near to the reflector, FIG. 15 shows an aperture-angle-dependent logarithmic representation of the light intensity of the stepped lens spotlight in the spot position thereof and in one of the flood positions thereof.

DETAILED DESCRIPTION OF PREFERRED EMBODIMENTS

The invention is described in more detail below with reference to preferred embodiments.

This description generally assumes that light entering the lens propagates in a manner coming from the left-hand side toward the right-hand side in the drawings.

Furthermore, in the description of the various embodiments, identical reference symbols are used for identical or essentially identically acting constituent parts of the optical arrangement 1.

The contents of the prior applications DE 103 61 122 and DE 103 61 117, which form the basis of the priority, in each case entitled "Stepped lens spotlights with coupled distance variation of lighting elements" is also incorporated in full into the content of the present application by reference.

Reference is made below to FIG. 1, which shows a first embodiment of the optical arrangement of a stepped lens with an essentially circular diffusing screen which is arranged approximately centrically and has individual facets that are slightly rotated with respect to one another.

The optical arrangement, designated in its entirety by 1, comprises a stepped lens 2 and also a diffusing screen 3 arranged in the central region thereof.

The stepped lens 2 has concentrically arranged, annular steps with optically effective surface regions which are provided with the reference symbol 4, 5 and 6 merely by way of example in FIG. 1.

The diffusing screen 3 illustrated in FIG. 1 and also that illustrated in FIGS. 2 and 3 are by way of example diffusing screens as described in the German Patent Application DE 103 43 630.8 from the same applicant, dated Sep. 19, 2003, entitled "diffusing screen", the entire content of which is also incorporated into the content of the present application by reference.

In the case of this particularly preferred embodiment, the optical arrangement 1 is produced from an essentially plane basic body 7 in a single hot-forming step, essentially in the case of an embodiment consisting of plastic.

Hereinafter, firstly only the common features of the optical arrangements 1 illustrated in FIGS. 1, 2 and 3 are described and then the respective differences thereof are explained in detail.

The circular diffusing screen 3 is arranged on the light exit side of the basic body 7 and extends over the entire area within the first annular segment 8, which is clearly delimited, and preferably adjoins said screen without any interruption.

In the case of a lens with a real, right-hand-side, thus positive focal point, the basic body 7 is preferably shaped in convex fashion or in outwardly curved fashion in the region of the diffusing screen 3 and also in the region of the annular surfaces 4, 5, 6 and 8, as is shown for example diagrammatically in the cross-sectional illustrations in FIG. 4 and FIG. 6.

In the case of a lens with a virtual or negative, left-hand-side focal point, the basic body 7 is preferably shaped in concave fashion or in inwardly curved fashion in the region of the diffusing screen 3 and also in the region of the annular surfaces 4, 5, 6 and 8, as is shown for example diagrammatically in a cross-sectional illustration in FIG. 5.

However, in particular when using a hybrid lens, which is shown in cross section in FIGS. 8 and 9, the basic body 7 may also be formed in two or more pieces and then comprises both the basic body segment 7 having the stepped lens 2 as well as a further basic body segment 9, which may be formed in planar or plane fashion, as illustrated in FIG. 8, or may be formed in planoconvex fashion, for example, as illustrated in FIG. 9.

Preferably, in the case of hybrid lenses, the basic body segment 9 is produced from glass of a first material and the basic body segment 7 is produced from glass of a second material with a different dispersion than that of the basic body segment 9 or is produced from a hot-formable plastic.

Reference is made hereinafter to FIG. 4 which shows a planoconvex stepped lens with a central diffusing screen 3, and also to FIG. 6, which reproduces a detail from FIG. 4 in an enlarged illustration.

In the case of the stepped lens 2 in one piece illustrated in FIG. 4 and FIG. 5, the respective optically effective surface 11, 12, 13 may be part of an aspherical or else spherical lens and the optical arrangement 1 may have an edge region 10 which may be formed in plane-parallel fashion for mounting in an assigned mechanical receptacle.

As part of an aspherical lens, the annular, optically effective surfaces of said steps (for example 4, 5, 6, 11, 12, 13) are shaped such that an approximately planar wave with phase fronts perpendicular to the optical axis is combined at a real focal point.

In this case, the optical axis is intended to extend through the center of the optical arrangement essentially perpendicular to the principle planes thereof.

In the case of the biconcave stepped lens illustrated in FIG. 5, the respective annular, optically effective surfaces are shaped such that, from a planar wave entering from the left, there are generated the phase fronts of a spherical wave whose virtual focal point or whose apparent origin appears to lie on the optical axis to the left of the stepped lens 2 illustrated in FIG. 5.

It is the case that these geometrical-optical conditions hold true exactly only for one wavelength in a central wavelength range of the light spectrum used.

In order to simplify production, instead of complex aspherical annular geometries, an aspherical lens may also be approximated by spherical ring segments.

In this case, spherical segments that are approximated as well as possible, hence circle-arc surface segments, are used for the respective surfaces of the rings in order to attain simpler production of the required embossing tools.

Another simplification consists for example in utilizing optical surfaces in the shape of cone envelopes for stepped lenses with a very high number of steps and only small respective optical path length differences between edge points of adjacent steps, which surfaces are then only adapted in their inclination to the average inclination of the aspherical lens.

In this case, the individual annular segments and the central circular segment of the stepped lens may be configured either in concave fashion or in convex fashion depending on whether light-converging or light-diffusing properties are desired.

In order to illustrate the extremely variable usability of the concepts according to the invention, FIG. 5 shows a biconcave stepped lens, FIG. 7 shows a convex-concave lens and FIG. 8 and FIG. 9 show hybrid lenses, of which the lens illustrated in FIG. 9 has chromatically corrected properties.

Reference is made below to the hybrid lens which is illustrated in FIG. 9 and in the case of which a planoconvex glass lens 14 with a real focal point on the right-hand side of the lens 14 is connected to a concave-convex diffusing stepped lens 15.

The respective refractive powers or focal lengths and also the refractive indices of the two lenses 14 and 15 are chosen overall such that a converging effect still results. This means that the overall result is a converging lens which a focal point shifted toward the right.

In this case, however, the material of the stepped lens 15 is chosen such that the effect of its dispersion, in the entire arrangement, proceeds counter to the effect of the dispersion of the planoconvex lens 14, so that the overall result is smaller chromatic aberrations for this lens system.

In an alternative configuration, the stepped lens 15 may also consist of an embossed plastic which is laminated onto the lens 14. This plastic lens 15 may be provided with an antiscratch layer 21.

If embossed glass lenses are used, the optical path length difference in the region of the respective step is preferably more than 100 optical wavelengths.

When embossed plastic stepped lenses are used, preferably an optical path length difference at the respective step of less than about 1000 optical wavelengths is preferred.

Furthermore, the annular segments arranged around the central circular segment of the stepped lens may essentially have the same radial extent 16, meaning the same step width 16, see FIG. 6, in particular. Steps of different heights consequently occur in this case, since the angles of inclination of the respective annular, optically active surface segments typically change with increasing distance from the center.

As an alternative, in order to achieve high precision in terms of production engineering in the case of materials that are difficult to shape, the height 17 of the optically effective surface segments may be kept constant, thus resulting in rings with widths of different magnitudes, see FIG. 6, in particular.

Furthermore, the stepped lens 2 and/or the diffusing screen 3 may be formed as a filter, in particular as a UV, IR or colored bandpass filter and/or as a conversion filter.

It is particularly advantageous if, for this purpose, an interference filter layer 20 is applied to one side, as illustrated by way of example on the left-hand side of the planoconvex lens 14 in the example in FIG. 9.

As an alternative, this interference filter layer system may also be used for shifting the color temperature or for compensating for spectral lines.

Furthermore, it is particularly advantageous if at least that surface of the optical arrangement 1 which respectively faces a light source consists of glass and is prestressed, preferably thermally prestressed, since this results in a distinctly increased thermal stability.

The diffusing screen 3 may generally be arranged both on the left-hand side, thus the light entry side, and on the right-hand side, thus the light exit side, of the optical arrangement 1.

Furthermore, it is possible, as illustrated merely diagrammatically in FIG. 7, for a diffusing screen 3 to be arranged in each case both on the light entry side and on the light exit side, so that their diffusing effect is superposed in a defined manner.

Furthermore, instead of having a sharp radial boundary, the diffusing screen 3 may also have regions that diffuse to different extents, for example a region that diffuses to a greater extent centrically and a region that diffuses to a lesser extent marginally and preferably runs out continuously.

For this purpose, the diffusing screen may for example have a defined granularity comprising a finer granularity structure in a central region 22 and, with increasing radial distance, a coarser granularity structure in a marginal region 23, also see FIG. 8 for these facts illustrated diagrammatically.

In the case of the embodiments described below of diffusing screens 3 that can be used as an alternative to simple granularities or matted regions, the new approach consists, inter alia, in departing from the regular arrangement of facets of a regular diffusing screen.

This is done, in the case of a first embodiment illustrated in FIG. 1, by providing a diffusing screen 3 having a transparent basic body 7, 9, the optically effective surface of the diffusing screen 3 being subdivided into facets 24, 25, 26, which are provided with reference symbols only by way of example, and each facet 24, 25, 26 being assigned an elevation or depression with a second surface formed in curved fashion, and the facets 24, 25, 26 being arranged such that they are rotated relative to one another, or assuming different geometrical shapes.

In this case, a facet is to be understood to be an area spanned by the edge contour of the respective geometrical shape. Depending on the formation of the first surface, i.e. the surface of the basic body 7 of the diffusing screen 3, as a planar or curved area, the facet 24, 25, 26 spanned by the geometrical shapes may likewise be planar or curved.

The elevation or depression assigned to the facet 24, 25, 26 represents an element of the diffusing screen 3. The elevation or depression has the facet 24, 25, 26 as base area and is situated at least essentially above or below said base area. The elevation or depression may act as a lens in the case of illumination.

This solution results in a superposition of a multiplicity of differently contoured light fields and thus as desired in a round light field.

Depending on the respective facet configuration and the constitution of the elevations or depressions assigned to the facets, it is possible to provide a light field having a selectable gradient of the illumination intensity, or one which emerges predeterminably in soft fashion or hard fashion.

A light field which emerges in soft fashion is one with a small gradient of the illumination intensity toward the edge of the light field. Conversely, a large gradient of the illumination intensity at the edge of the light field results in a light field which emerges in hard fashion. A further advantage achieved is that this facet configuration makes it possible to avoid marginal discolorations when using discharge lamps.

In order to increase the variation of the individual light fields that contribute to the superposition and to achieve the abovementioned advantages by this means, it is possible to implement various measures.

Thus, it may be provided that the facets have a polygonal edge contour. In this case, the number of corners of the polygons is variable.

The facets with a polygonal edge contour should completely cover the surface since otherwise there is no diffusing effect locally.

Furthermore, it is also possible to provide diffusing screens in which the facets 24, 25, 26 contain different areas, as is illustrated by way of example in FIG. 2.

Triangles, quadrangles, pentagons, hexagons and/or heptagons may be chosen as the polygons. The connecting sections between adjacent corners of the polygons may be straight or bent lines.

A further consequence of the irregularity of the facets is that the latter have different orientations.

A further measure that is taken to approach the aim of round light fields, and light fields that emerge in soft fashion or in hard fashion with regard to the illumination intensity toward the edge, is the choice and, if appropriate, variation of the respective curvature of the elevations or depressions. The curvature may be spherical, and the elevation or depression may correspondingly be formed in the shape of a spherical cap. As an alternative, the curvature may be chosen to be aspherical. Furthermore, in order to ensure the abovementioned aim, it is possible to vary the depth of the recesses or the height of the elevations.

It is evident from the explanations above that the measures presented may be provided alternatively or cumulatively. For practical implementation of the solution mentioned above, a first solution variant provides a diffusing screen which has a transparent basic body with a first surface, the first surface being subdivided into facets, and in the case of which each facet is assigned an elevation or depression with a second surface formed in curved fashion, and in which the vertices S of the elevations or depressions are arranged along a spiral.

The vertex S of the elevation or depression shall be defined as the point of intersection between the normal to the surface of the facet passing through the facet centroid and the curved surface of the elevation or depression.

If the elevation, the radius and/or the depth of the elevation or depression differ in the case of two adjacent facets, then the common edge is generally curved, and edges which assume different geometrical shapes in a plan view result for the depressions.

The arrangement of the vertices S along a spiral produces a multiplicity of irregularly arranged facets which, as desired, create a round light field which, in the case of discharge lamps, has no discolorations in the edge region, and the illumination intensity gradient of which can be predetermined.

The height of the elevations or depressions can be varied across the diffusing screen 3, so that the elevations and depressions turn out to have different heights or depths. This also contributes to the aim of providing a round light field which emerges more or less in soft fashion or in hard fashion.

In a configuration of the diffusing screen 3 illustrated in FIG. 3, the vertices S of the facets 24, 25, 26 are essentially situated on an Archimedes' spiral.

The individual points are obtained by continued removal of a constant arc length L along the spiral from the inside outward. The vertices may be arranged equidistantly from one another. In addition to the equidistant arrangement of the vertices, a variable arc length L is also possible. An arc length L that increases from the inside outward may thus be chosen. Within the diffusing screen, small facets with elevations having a small height or with depressions having a small depth, and hence a small diffusing effect are obtained in this way. Toward the edge, the facets become larger, the height of the elevations or the depth of the depressions becomes larger and the diffusing effect likewise becomes greater. The light field then has a rather small half scattering angle with a very large illumination intensity in the center. In contrast to this, given a constant L, the illumination intensity would be rather plateau-shaped and run out in soft fashion.

The measures mentioned above which can be implemented alternatively and, if appropriate, cumulatively, permit the diffusing screen 3 to be adapted to the respective illumination system, for example the respective reflector, in a diverse manner.

Thus, adaptation to a reflector may be effected through the choice of the type of spiral, the value of the arc length L, but also by variation or constancy of the arc length. These measures make it possible to influence the light field in predetermined regions of the illumination system, to locally amplify or attenuate it, and thus permit the light field to be optimized in a diverse manner.

It is apparent from the explanations above that the solution variants provide the person skilled in the art with a wealth of parameters as to how he can configure and adapt the light field taking account of the illumination system. In this respect, the chosen approach of the different geometrical shapes for the facets permits highly diverse and variable adaptation of the light field to the respective conditions.

By way of example, FIGS. 1 and 2 show further preferred embodiments. FIG. 1 illustrates a first embodiment of the optical arrangement of a stepped lens with an approximately centrically arranged, essentially circular diffusing screen having individual facets that are slightly rotated with respect to one another, and FIG. 2 shows a second embodiment of the optical arrangement of a stepped lens with an approximately centrically arranged, essentially circular diffusing screen having facets which have been offset from their regular position by means of a Monte Carlo method.

It is furthermore the case that a plurality of possibilities which differ in terms of their design are also open for the realization of a light field as desired or a predefined diffusing behavior as desired. In this respect, the solution variants also permit the provision of optimized diffusing screens with regard to the esthetic appearance. By way of example, a rhomboid pattern or the shape of a houndstooth pattern may be used for the facet.

Furthermore, it is also possible within the scope of the invention to use non-coaxial or non-concentric arrangements of the diffusing screen.

Preferred illumination embodiments in which the light mixing system of the present invention can be used particularly advantageously are discussed by way of example below.

DETAILED DESCRIPTION OF PREFERRED EMBODIMENTS OF ILLUMINATION DEVICES

Stepped Lens Spotlights Comprising a Stepped Lens Having a Positive Refractive Power Reference is made below to FIG. 10, which shows one embodiment of the stepped lens spotlight in the spot position.

The stepped lens spotlight essentially contains an ellipsoidal reflector 31, a lamp 32, which may be an incandescent lamp, in particular a halogen lamp, a light emitting diode, a light emitting diode array or a gas discharge lamp, and a stepped lens 33, which is a converging lens, preferably a planoconvex stepped lens.

In FIG. 10, the focal point F2 of the ellipsoidal reflector 31 that is remote from the reflector is approximately superimposed with the real or positive focal point F3 of the stepped lens 33 on the left-hand side.

The light bundle 34 emerging from the spotlight is indicated only schematically in the figures by its outer marginal rays.

The distances a between the stepped lens 33 and the front edge of the reflector 31, and b between the lamp 32 and the vertex of the reflector 31, are likewise illustrated in FIG. 10.

The spot position is set by arranging the lamp filament or the discharge arc of the lamp 2 essentially at the reflector-side focal point F1 of the reflector ellipsoid 1.

The light reflected from the reflector 31 is, in this position, directed virtually completely onto the focal point F2 of the ellipsoid 31 that is remote from the reflector. The positive or real focal point F3 of the stepped lens 33 on the left-hand side then coincides approximately with the focal point F2 of the reflector ellipsoid 31.

In FIG. 31 it is also possible to discern in the near field how the opening 35 within the reflector 32 acts as a dark region 36 in the parallel beam path of the light field 34.

A circular centrically arranged diffusing screen 37 is provided within the stepped lens 33, and generates a defined scattered light ratio and a defined aperture angle of the scattered light. This provides a defined mixing ratio of the scattered light relative to the light which is geometrical-optically imaged by the stepped lens 33.

As an alternative to this embodiment of the diffusing screen 37, in a further embodiment the scattering effect changes continuously along the radius of the diffusing screen 37, so that more strongly scattering regions are arranged in the center of the diffusing screen 37 and less strongly scattering regions are arranged at the abruptly ending edge of said screen.

In yet another alternative configuration, the edge of the diffusing screen 37 is formed such that not only does it end abruptly but its scattering effect decreases continuously and said edge may also extend under or above the stepped lens.

As a result, further adaptations to the position-dependent mixing ratios are performed in a manner dependent on the system, so that the person skilled in the art can always provide an optimum mixing ratio for a homogeneously illuminated light field or else for light fields with locally higher intensities that are generated in a defined manner.

It can furthermore be discerned from FIG. 10 that only a small portion of the total light passes through the diffusing screen 37 in the spot position.

The diffusing screen 37 results in a very homogeneous illumination, as is represented by the line 38 for the spot position in FIG. 12, which shows an aperture-angle-dependent logarithmic representation of the light intensity of the stepped lens spotlight.

FIG. 11 shows the embodiment of the stepped lens spotlight as illustrated in FIG. 10 in a first flood position, in which the focal point F2 of the reflector 31 that is remote from the reflector is arranged approximately in a surface of the stepped lens 33 that is near to the reflector.

In this case, the value of the shift a with respect to the spot position is altered in a defined manner by means of a mechanical guide.

The construction corresponds in principle to the construction of the stepped lens spotlight as elucidated in FIG. 10.

However, it can clearly be discerned from FIG. 11 that both the aperture angle of the emerging light beam bundle 34 and that of the dark region 36 have increased.

However, since in this position a very high proportion of the light impinges only on a very small region in the center of the diffusing screen 37, precisely this region can be configured such that its forward scattering lobe approximately compensates for the dark region 36 in the far field or far zone in a desired manner. Reference shall also be made to FIG. 36, which represents the light conditions with the line 39 by way of example for a flood position.

A significantly more compact design of the stepped lens spotlight with an even higher useable luminous efficiency can be achieved with the embodiment of a stepped lens spotlight that is described below.

Stepped Lens Spotlight Comprising a Stepped Lens Having a Negative Refractive Power Reference is made below to FIG. 13, which shows one embodiment of the stepped lens spotlight in the spot position. The stepped lens spotlight essentially contains an ellipsoidal reflector 41, a lamp 42, which may be a halogen lamp or else a discharge lamp, and a stepped lens 43, which is a converging lens, preferably a biconcave stepped lens.

In FIG. 13, the focal point F2 of the ellipsoidal reflector 41 that is remote from the reflector is approximately superimposed with the virtual or negative focal point F3 of the stepped lens 43 on the right-hand side.

The light bundle 44 emerging from the spotlight is indicated only schematically in the figures by its outer marginal rays.

The distances a between the stepped lens 43 and the front edge of the reflector 41, and b between the lamp 42 and the vertex of the reflector 41, are likewise illustrated in FIG. 13.

The spot position is set by arranging the lamp filament or the discharge arc of the lamp 42 essentially at the reflector-side focal point F1 of the reflector ellipsoid 41.

The light reflected from the reflector 41 is, in this position, directed virtually completely onto the focal point F2 of the ellipsoid 41 that is remote from the reflector. The negative or virtual focal point F3 of the stepped lens 43 on the right-hand side then coincides approximately with the focal point F2 of the reflector ellipsoid 41.

In FIG. 13 it is also possible to discern in the near field how the opening 45 within the reflector 41 acts as a dark region 46 in the parallel beam path of the light field 44.

A circular centrically arranged diffusing screen 47 is provided within the stepped lens 43, and generates a defined scattered light ratio and a defined aperture angle of the scattered light. This provides a defined mixing ratio of the scattered light relative to the light which is geometrical-optically imaged by the stepped lens 43.

As an alternative to this embodiment of the diffusing screen 47, in a further embodiment the scattering effect changes continuously along the radius of the diffusing screen 47, so that more strongly scattering regions are arranged in the center of the diffusing screen 47 and less strongly scattering regions are arranged at the abruptly ending edge of said screen.

In yet another alternative configuration, the edge of the diffusing screen 47 is formed such that not only does it end abruptly but its scattering effect decreases continuously and said edge may also extend under or above the stepped lens.

As a result, further adaptations to the precision-dependent mixing ratios are performed in a manner dependent on the system, so that the person skilled in the art can always provide an optimum mixing ratio for a homogeneously illuminated light field or else for light fields with locally higher intensities that are generated in a defined manner.

It can furthermore be discerned from FIG. 13 that only a small portion of the total light passes through the diffusing screen 47 in the spot position.

In this embodiment, too, the diffusing screen 47 results in a very homogeneous illumination, as is represented by the line 48 for the spot position in FIG. 15, which shows an aperture-angle-dependent logarithmic representation of the light intensity of the stepped lens spotlight.

FIG. 14 shows the embodiment of the stepped lens spotlight as illustrated in FIG. 13 in a first flood position, in which the focal point F2 of the reflector 41 that is remote from the reflector is arranged approximately in a surface of the stepped lens 43 that is near to the reflector.

In this case, the value of the shift a with respect to the spot position is altered in a defined manner by means of a mechanical guide.

The construction corresponds in principle to the construction of the stepped lens spotlight as elucidated in FIG. 13. However, it can clearly be discerned from FIG. 14 that both the aperture angle of the emerging light beam bundle 44 and that of the dark region 46 have increased.

However, since in this position a very high proportion of the light impinges only on a very small region in the center of the diffusing screen 47, precisely this region can be configured such that its forward scattering lobe approximately compensates for the dark region 46 in the far field or far zone in a desired manner. Reference shall also be made to FIG. 15, which represents the light conditions with the line 49 by way of example for a flood position.

In the embodiments described above, the first and second regions which are in each case assigned to the stepped lens and the diffusing screen occupy real surfaces of the optical arrangement, in the form of concentrically arranged surfaces having different diameters ($2R_{StI}$, $2R_{strA}$). In this case, the diffusing screen lies within a circle having the radius $R_{strA}$ and is subdivided once again in a further configuration.

The diffusing screen having the radius $R_{strA}$ contains a concentric smaller circle having the diameter $2R_{strI}$, which has a different diffusing behavior in this alternative configuration.

The ratio of the surface size of the stepped lens surface to the diffusing screen surface defines the ratio of the portions—taking effect in each case—of the emerging light that can be utilized for illumination purposes, and, depending on the embodiment according to the invention, is greater than 2 to 1 (stepped lens surface to diffusing screen surface), the ratio of the surface size of the stepped lens surface to the diffusing screen surface is preferably greater than 10 to 1 and the ratio of the surface size of the stepped lens surface to the diffusing screen surface is most preferably greater than 100 to 1.

In a further configuration according to the invention, the aperture angle of the light emerging from the diffusing screen in the vertical direction is different from the aperture angle in the horizontal direction and a light field illuminated in non-round, ellipsoidal, polygonal and in particular rectangular and/or square fashion is thereby generated by the diffusing screen depending on the embodiment.

The subdivision of the diffusing screen into regions having different scattering behaviors, in particular different degrees of scattering behavior, also permits the type of light incidence to become controllable. The round light field of the spot position, in the event of adjustment, may for example firstly undergo transition to a square light field with a soft edge fall if the light cone, although still covering the entire diffusing screen diameter $2R_{StrA}$, no longer covers the stepped lens and, with further adjustment and the light cone becoming smaller, the light field may undergo transition to a light field with a hard edge fall if the light cone only covers an internal diameter $2R_{StrI}$, the portions of which direct the light only into the square light field but only into the latter very much more exactly.

The elliptical reflector having the basic body of an ellipse can be defined mathematically exactly by the principal axes Ha, Hb thereof, see FIG. 14, it being assumed for the reflector 31, 41 that the latter is formed such that it is cylindrically symmetrical and rotationally invariant, which means that it is completely defined by specifying the two mutually different principal axes Ha and Hb.

The ellipticity of the reflector 31, 41, see FIG. 14 for example, denotes the ratio of its principal axes $\epsilon=$Ha/Hb of the ellipse defining its form, and a reflector arrangement that is cylindrically symmetrical with respect to the optical axis of the stepped lens spotlight is taken as a basis in this case.

Furthermore, the reflector illustrated in FIG. 14 is intended to correspond approximately to half a centrically divided ellipse or not to deviate too greatly from this, merely for the explanation and to afford a better understanding of the inequality below.

For a configuration that is advantageous from an illumination standpoint and has a high luminous efficiency, the value of $\epsilon$ should be greater than 1.

Preferably, for the stepped lens spotlight of the embodiments described above with an elliptic reflector 31, 41 having an ellipticity $\epsilon$, the ratio of the focal length to the radius $n_{Sr1}=R_{Sr1}/F_{Sr1}$ of the stepped lens is greater than 0.5 times $1/\sqrt{(\epsilon^2-1)}$, preferably greater than 0.7 times $1/\sqrt{(\epsilon^2-1)}$, most preferably greater than 0.9 times $1/\sqrt{(\epsilon^2-1)}$, where $1/\sqrt{(\epsilon^2-1)}$ represents the reciprocal of the root of $(\epsilon^2-1)$.

The use of the stepped lens according to the invention with a diffusing screen enables a considerably higher portion of the luminous flux emitted by the lamp 32, 42 to be utilized for illumination purposes, for example up to more than 50% more of the light emitted by the lamp 32, 42 is directed into the field to be illuminated. In the spot position, essentially the entire light coming from the reflector 31, 41 can be directed into the narrow light field of the spot illumination and, in this case, the portion of the light that is incident on the diffusing screen 37, 47 forms a softly tapering-off edge, which is highly desirable for many illumination purposes.

In the embodiment of the stepped lens spotlight with a stepped lens having a negative refractive power, it is also possible, particularly in its spot position, to utilize virtually the entire portion of the light which, directly from the lamp 42 forward, directly enters the stepped lens and the diffusing screen, since this portion largely likewise contributes to the softly tapering-off edge region of the illuminating light.

For the first time up to more than 80% of the light emerging from the lamp 42 can be utilized in the spot position of the stepped lens spotlight, and up to more than 60% of the light emerging from the lamp 42 can be utilized in the flood position.

By choosing the area ratio between illuminated area of the stepped lens and illuminated area of the diffusing screen, it is possible to set this ratio between light portion in the spot region and in the edge region as desired, for example by choosing the diameter of the diffusing screen and the diameter of the stepped lens. It is thereby possible to provide stepped lens spotlights having a light field that falls off to a greater extent or more softly toward the edge in the spot position.

The stepped lens spotlight described above is particularly advantageously used in an illumination set together with an electrical power supply unit or ballast which is significantly reduced in size in comparison with the prior art. Said power supply unit can be designed both electrically and mechanically to be smaller for the same useable light power in comparison with the prior art since the stepped lens spotlight according to the invention has a significantly higher luminous efficiency. Consequently, less weight is required and a smaller storage space is occupied for transportation and storage.

As a result of this, however, the total thermal loading on illuminated persons and objects is also reduced, particularly when using cold light reflectors.

Furthermore, the stepped lens spotlight according to the invention can be used advantageously for increasing the luminous efficiency and the homogeneity of the illuminated light field in flashlights as well.

LIST OF REFERENCE SYMBOLS

1 Arrangement
2 Stepped lens
3 Diffusing screen
4 Annular, concentric essentially optically effective surface segments
5 Ditto
6 Ditto
7 Basic body (segment)
8 As 4 to 6
9 Basic body segment of the multipartite arrangement
10 Plane-parallel edge region
11 Optically effective surface
12 Ditto
13 Ditto
14 Planoconvex lens made of solid material
15 Convex-concave stepped lens
16 Radial extent of the optically effective surface segments, width
17 Height of the optically effective surface segments
18 Antireflection layer
19 Antiscratch layer
20 Interference filter layer
21 Antiscratch layer
22 Centric region that diffuses to a greater extent
23 Marginal region that diffuses to a lesser extent
24 Facet
25 Ditto
26 Ditto
31 Reflector
32 Lamp
33 Stepped lens
34 Emerging light bundle
35 Opening in the reflector 1
36 Dark region
37 Diffusing screen
38 Intensity distribution in the spot position
39 Intensity distribution in the flood position
41 Reflector
42 Lamp
43 Stepped lens
44 Emerging light bundle
45 Opening in the reflector 1
46 Dark region
47 Diffusing screen
48 Intensity distribution in the spot position
49 Intensity distribution in the flood position

The invention claimed is:

1. A stepped lens spotlight, comprising:
   a lamp;
   a reflector; and
   a stepped lens with a diffusing screen, the diffusing screen being arranged in a first region and the stepped lens is arranged in a second region, wherein the first and second regions occupy concentrically arranged surfaces having different diameters, and
   wherein an aperture angle of the light emerging from the stepped spotlight is settable between a flood position and a spot position, and wherein, in said flood position, a larger portion of light emitted by said lamp passes through said diffusing screen in comparison to said spot position.

2. The stepped lens spotlight as claimed in claim 1, wherein the aperture angle is settable based on a change in the diameter of the light impinging on the optical arrangement without altering the angle of incidence of the light illuminating the optical arrangement.

3. The stepped lens spotlight as claimed in claim 1, further comprising a ratio of surface size of the stepped lens to surface size of the diffusing screen of greater than 2 to 1.

4. The stepped lens spotlight as claimed in claim 3, wherein the ratio is greater than 10 to 1.

5. The stepped lens spotlight as claimed in claim 3, wherein the ratio is greater than 100 to 1.

6. The stepped lens spotlight as claimed in claim 1, wherein the aperture angle of the light emerging from the diffusing screen in a vertical direction is different from the aperture angle in a horizontal direction.

7. The stepped lens spotlight as claimed in claim 1, wherein the diffusing screen comprises a plurality of annular surface regions, which scatter light in each case in different directions or to different extents.

8. The stepped lens spotlight as claimed in claim 1, wherein, for a stepped lens spotlight having an elliptic reflector having an ellipticity $\epsilon$, the ratio of the focal length to the radius $n_{Sл}=R_{Sл}/F_{Sл}$ of the stepped lens is greater than 0.5 times $1/\mathrm{sqrt}(\epsilon^2-1)$.

9. The stepped lens spotlight as claimed in claim 8, wherein the ratio is greater than 0.7 times $1/\mathrm{sqrt}(\epsilon^2-1)$.

10. The stepped lens spotlight as claimed in claim 8, wherein the ratio is greater than 0.9 times $1/\mathrm{sqrt}(\epsilon^2-1)$.

11. The stepped lens spotlight as claimed in claim 1, wherein the diffusing screen is arranged only in a central and/or centric region of the stepped lens.

12. The stepped lens spotlight as claimed in claim 1, wherein the diffusing screen is arranged at a light exit area and/or a light entry area.

13. The stepped lens spotlight as claimed in claim 1, wherein the light-diffusing element has a region that diffuses to a greater extent centrically and a region that diffuses to a lesser extent marginally.

14. The stepped lens spotlight as claimed in claim 1, wherein the material of the stepped lens and/or of the diffusing screen comprises a material selected from the group consisting of glass, glass-ceramic material, plastic, and a hybrid composite made of glass and plastic.

15. The stepped lens spotlight as claimed in claim 1, wherein the stepped lens is an aspherical lens or a spherical lens.

16. The stepped lens spotlight as claimed in claim 1, wherein the stepped lens has a basic body with an essentially planar surface.

17. The stepped lens spotlight as claimed in claim 1, wherein the stepped lens has an optically beam-shapingly effective basic body with a surface having shape selected from the group consisting of an essentially concave spherical shape, an essentially concave aspherical shape, an essentially convex spherical shape, and an essentially convex aspherical shape.

18. The stepped lens spotlight as claimed in claim 1, wherein the concentrically arranged surfaces have a circle-arc segment shape or a cone envelope shape.

19. The stepped lens spotlight as claimed in claim 1, wherein the concentrically arranged surfaces are shaped such that an approximately planar wave with phase fronts perpendicular to the optical axis is combined at a real focal point or is converted into a spherical wave whose midpoint appears to lie at a virtual focal point.

20. The stepped lens spotlight as claimed in claim 1, wherein the stepped lens comprises a material with a first dispersion behavior and a further lens with an opposite refractive power and with a material with a second dispersion behavior so that chromatic aberrations are reduced.

21. The stepped lens spotlight as claimed in claim 1, wherein the stepped lens is an embossed plastic lens with an optical path length difference at the respective step of less than about 1000 optical wavelengths.

22. The stepped lens spotlight as claimed in claim 1, wherein the stepped lens is formed or arranged on a first side and the diffusing screen is formed or arranged on a side opposite to the first side.

23. The stepped lens spotlight as claimed in claim 1, wherein the concentrically arranged surfaces essentially have the same radial extent.

24. The stepped lens spotlight as claimed in claim 1, wherein the concentrically arranged surfaces comprises at least two adjacent annular segments having stepped elevations essentially having the same height.

25. The stepped lens spotlight as claimed in claim 1, wherein at least that surface of the optical arrangement which faces the light source comprises thermally prestressed glass.

26. The stepped lens spotlight as claimed in claim 1, wherein the stepped lens and/or the diffusing screen are/is formed as a filter selected from the group consisting of a UV filter, an IR filter, a colored bandpass filter, a conversion filter, and any combinations thereof.

27. The stepped lens spotlight as claimed in claim 1, wherein the stepped lens and/or the diffusing screen are coated with a mechanical antiscratch layer and/or an antireflection layer.

28. The stepped lens spotlight as claimed in claim 1, wherein the stepped lens is a planoconvex converging lens or a biconcave negative lens.

29. The stepped lens spotlight as claimed in claim 1, wherein the stepped lens has a negative focal length.

30. The stepped lens spotlight as claimed in claim 1, further comprising an ellipsoidal reflector.

31. The stepped lens spotlight as claimed in claim 30, wherein the stepped lens has a virtual focal point that can be superimposed with a focal point of the reflector that is remote from the ellipsoidal reflector in a spot position of the stepped lens.

32. The stepped lens spotlight as claimed in claim 30, wherein the ellipsoidal reflector comprises a metallic or transparent dielectric glass and/or plastic.

33. The stepped lens spotlight as claimed in claim 30, further comprising an auxiliary reflector arranged between the stepped lens and the ellipsoidal reflector.

34. The stepped lens spotlight as claimed in claim 1, wherein the diffusing screen has a first surface that is subdivided into facets, each facet being assigned an elevation or depression with a second surface formed in curved fashion, wherein the facets assume different geometrical shapes.

35. The stepped lens spotlight as claimed in claim 34, wherein the facets have a polygonal edge contour.

36. The stepped lens spotlight as claimed in claim 34, wherein the facets contain different areas.

37. The stepped lens spotlight as claimed in claim 34, wherein the facets assume a shape selected from the group consisting of a triangle, quadrangle, pentagon, hexagon, heptagon, and any combinations thereof.

38. The stepped lens spotlight as claimed in claim 34, wherein the facets have different orientations.

39. The stepped lens spotlight as claimed in claim 34, wherein the elevations or depressions are formed in the shape of spherical caps.

40. The stepped lens spotlight as claimed in claim 34, wherein the height of the elevations and/or the depth of the depressions are different.

41. The stepped lens spotlight as claimed in claim 34, wherein the respective vertices of the elevations or depressions are arranged along a spiral.

42. The stepped lens spotlight as claimed in claim 41, wherein the vertices are arranged on an Archimedes' spiral.

43. The stepped lens spotlight as claimed in claim 41, wherein the arc length between two adjacent vertices along the spiral is almost equidistant.

44. The stepped lens spotlight as claimed in claim 41, wherein the wherein the arc length between two adjacent vertices along the spiral are variable.

45. The stepped lens spotlight as claimed in claim 34, wherein the facets that are rotated relative to one another.

46. The stepped lens spotlight as claimed in claim 34, wherein the facets are offset from their regular position by means of a Monte Carlo method.

47. The stepped lens spotlight as claimed in claim 34, wherein the diffusing screen has a defined granularity that becomes finer in a central region and coarser with increasing distance from the center.

* * * * *